(12) United States Patent
Chen et al.

(10) Patent No.: US 10,700,562 B2
(45) Date of Patent: Jun. 30, 2020

(54) MOTOR WITH SEPARATED PERMANENT MAGNET TORQUE AND RELUCTANCE TORQUE AND ITS OPTIMAL EFFICIENCY CONTROL

(71) Applicant: JIANGSU UNIVERSITY, Jiangsu (CN)

(72) Inventors: Qian Chen, Jiangsu (CN); Wenxiang Zhao, Jiangsu (CN); Guohai Liu, Jiangsu (CN); Jinghua Ji, Jiangsu (CN); Gaohong Xu, Jiangsu (CN); Zhipeng Lin, Jiangsu (CN)

(73) Assignee: JIANGSU UNIVERSITY (CN)

( * ) Notice: Subject to any disclaimer, the term of this patent is extended or adjusted under 35 U.S.C. 154(b) by 8 days.

(21) Appl. No.: 15/544,212

(22) PCT Filed: Mar. 16, 2016

(86) PCT No.: PCT/CN2016/076434
§ 371 (c)(1),
(2) Date: Jul. 17, 2017

(87) PCT Pub. No.: WO2017/128498
PCT Pub. Date: Aug. 3, 2017

(65) Prior Publication Data
US 2018/0323665 A1    Nov. 8, 2018

(30) Foreign Application Priority Data

Jan. 26, 2016   (CN) .......................... 2016 1 0053211

(51) Int. Cl.
*H02K 1/27*     (2006.01)
*H02K 16/04*    (2006.01)
(Continued)

(52) U.S. Cl.
CPC ............... *H02K 1/27* (2013.01); *H02K 15/03* (2013.01); *H02K 16/00* (2013.01); *H02P 21/00* (2013.01);
(Continued)

(58) Field of Classification Search
CPC ...... H02K 1/27; H02K 1/2706; H02K 1/2713; H02K 1/2753; H02K 1/2793; H02K 15/03;
(Continued)

(56) References Cited

U.S. PATENT DOCUMENTS 5,894,902 A * 4/1999 Cho ..................... B60K 7/0007
                                                180/65.51
5,952,756 A   9/1999 Hsu et al. .............. H02K 16/04
(Continued)

FOREIGN PATENT DOCUMENTS

CN    101741154    6/2010    ............... H02K 1/14
CN    103441630    12/2013   ............. H02K 16/00
(Continued)

OTHER PUBLICATIONS

International Search Report issued in corresponding PCT Application Serial No. PCT/CN2016/076434 dated Oct. 28, 2016 with English translation (6 pages).
(Continued)

*Primary Examiner* — Edgardo San Martin
(74) *Attorney, Agent, or Firm* — Hayes Soloway P.C.

(57) ABSTRACT

An electric motor includes 3 stators and 1 rotor which employs distributed winding. The axial magnetic circuit generates permanent magnet torque, while the radial magnetic circuit generates reluctance torque. By decoupling the axial and radial magnetic circuits, the separation and the independent control of the permanent magnet torque and the reluctance torque are realized. Each stator and rotor can be (Continued)

processed independently, and modular installation can be processed, thereby reducing the difficulty of motor processing.

8 Claims, 8 Drawing Sheets

(51) Int. Cl.
| | |
|---|---|
| *H02K 16/00* | (2006.01) |
| *H02P 21/16* | (2016.01) |
| *H02P 21/00* | (2016.01) |
| *H02P 25/08* | (2016.01) |
| *H02P 25/024* | (2016.01) |
| *H02K 15/03* | (2006.01) |
| *H02K 21/24* | (2006.01) |
| *H02K 19/10* | (2006.01) |
| *H02K 1/24* | (2006.01) |
| *H02K 3/28* | (2006.01) |

(52) U.S. Cl.
CPC .............. *H02P 21/16* (2016.02); *H02P 21/50* (2016.02); *H02P 25/024* (2016.02); *H02P 25/08* (2013.01); *H02K 1/246* (2013.01); *H02K 1/276* (2013.01); *H02K 3/28* (2013.01); *H02K 19/103* (2013.01); *H02K 21/24* (2013.01); *H02P 2207/05* (2013.01)

(58) Field of Classification Search
CPC ........ H02K 15/02; H02K 16/00; H02K 16/04; H02K 21/029; H02K 3/18; H02K 3/28; H02P 21/16; H02N 15/00
See application file for complete search history.

(56) References Cited

U.S. PATENT DOCUMENTS

| | | | | |
|---|---|---|---|---|
| 6,373,162 B1 * | 4/2002 | Liang | ................... | H02K 1/2793 310/112 |
| 6,791,222 B1 * | 9/2004 | Maslov | ................. | H02K 21/12 310/156.38 |
| 6,891,306 B1 * | 5/2005 | Soghomonian | ........ | H02K 1/182 310/156.38 |
| 7,034,422 B2 * | 4/2006 | Ramu | .................... | H02K 1/246 310/112 |
| 7,679,256 B2 * | 3/2010 | Tatematsu | ................ | H02K 3/28 310/156.38 |
| 7,768,170 B2 * | 8/2010 | Tatematsu | .............. | H02K 1/278 310/156.35 |
| 8,242,653 B2 * | 8/2012 | Ichiyama | ............... | H02K 16/00 310/156.44 |
| 9,013,082 B2 * | 4/2015 | Ge | .......... | H02K 1/27 310/114 |
| 2005/0151437 A1 * | 7/2005 | Ramu | .................... | H02K 1/246 310/114 |
| 2009/0001831 A1 * | 1/2009 | Cho | ........................ | H02K 7/09 310/112 |
| 2014/0199179 A1 * | 7/2014 | Da Silva | ............. | F16C 32/0495 417/44.1 |

FOREIGN PATENT DOCUMENTS

| | | | | |
|---|---|---|---|---|
| CN | 104716754 | | 6/2015 | ............... H02K 1/06 |
| CN | 105048740 | | 11/2015 | ............. H02K 16/00 |
| EP | 2555394 | A1 * | 8/2011 | ............. H02K 16/04 |
| JP | 6193456 | B1 * | 9/2017 | ............. H02K 21/14 |
| WO | WO-2015193562 | A1 * | 12/2015 | ............. H02K 21/14 |
| WO | WO-2018037903 | A1 * | 3/2018 | ............. H02K 21/14 |

OTHER PUBLICATIONS

Written Opinion of the International Searching Authority issued in corresponding PCT Application Serial No. PCT/CN2016/076434 dated Oct. 28, 2016 (3 pages).

* cited by examiner

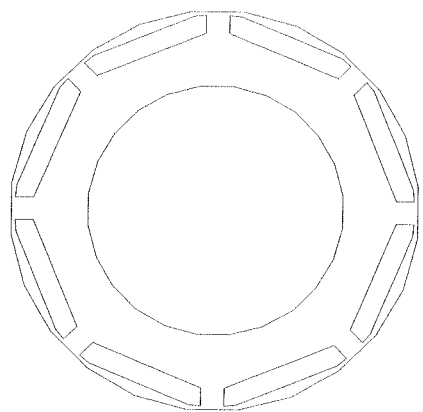
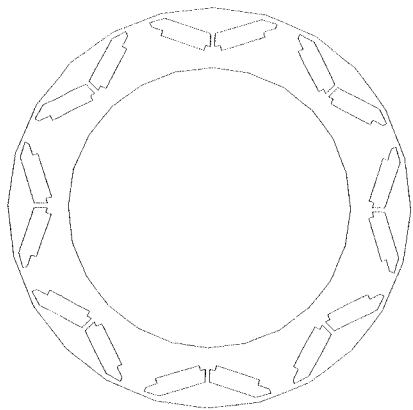
Fig. 3  (a) Flat type rotor
Fig. 3  (b) V type rotor
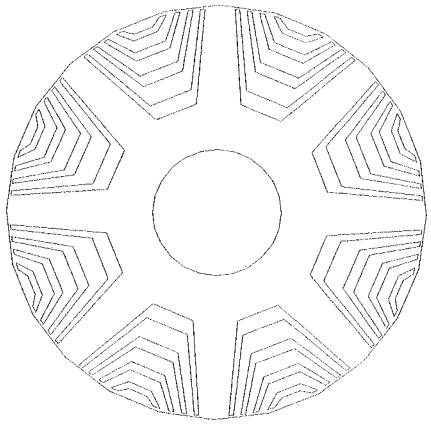
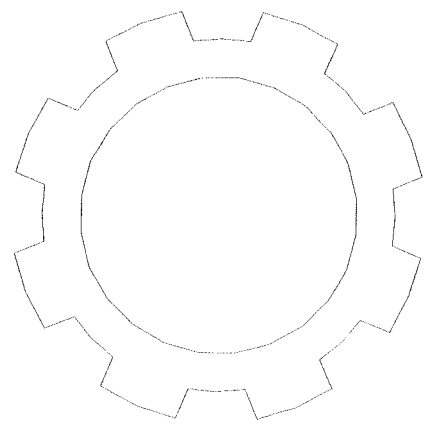
Fig. 3  (c) multi trapezoidal air rotor
Fig. 3  (d) SRM rotor
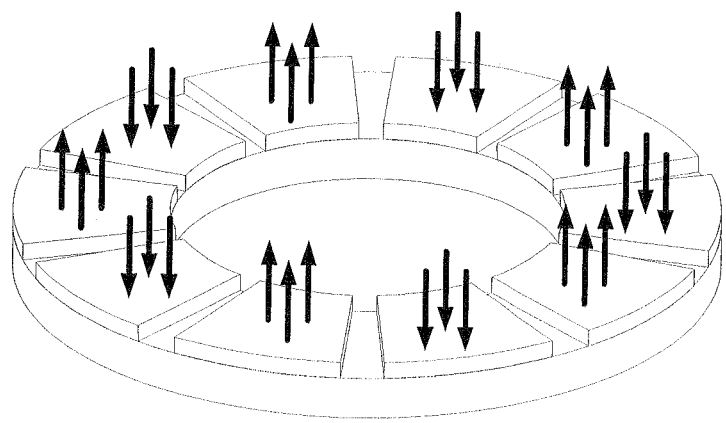
Fig. 4

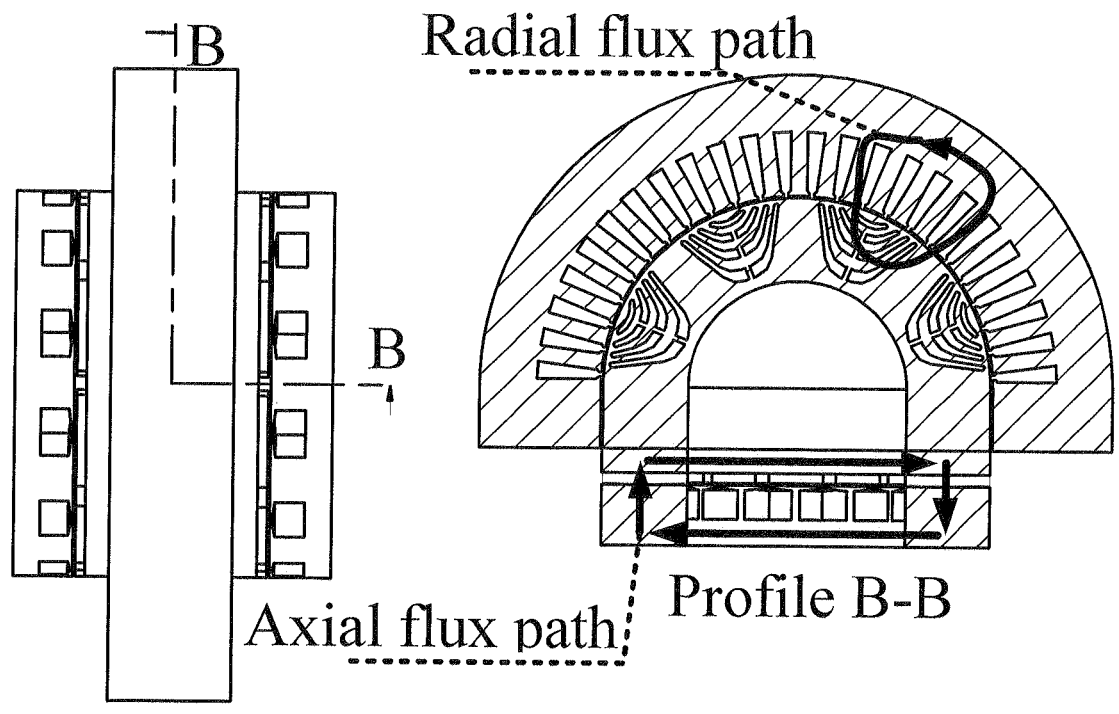
Fig. 5(a)
Fig. 5 (b)
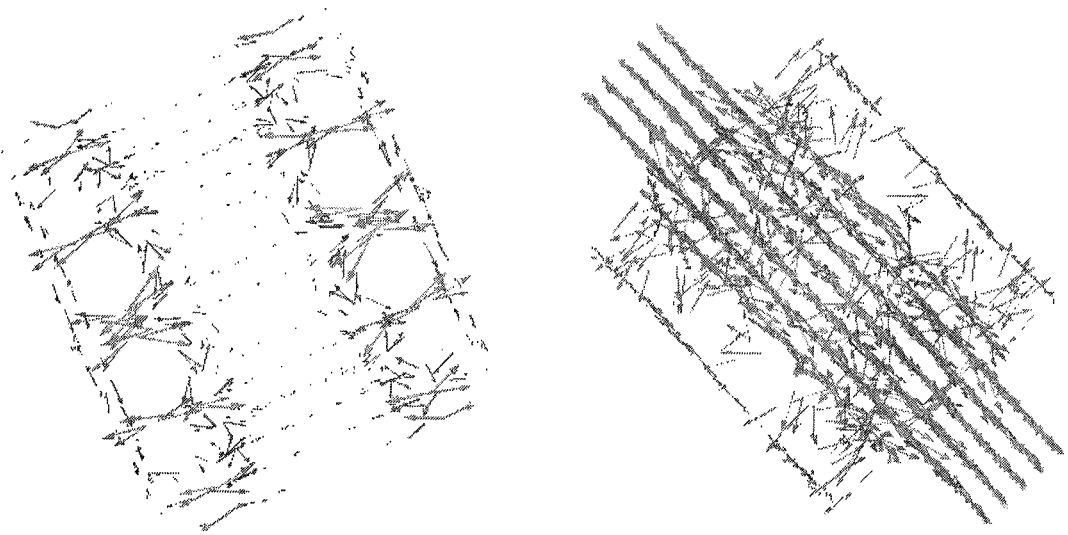
Fig. 6 (a)
Fig. 6 (b)

US 10,700,562 B2

MOTOR WITH SEPARATED PERMANENT MAGNET TORQUE AND RELUCTANCE TORQUE AND ITS OPTIMAL EFFICIENCY CONTROL

FIELD OF THE INVENTION

This invention belongs to the field of motor and its drive system, referred in particular to a motor with separated permanent magnet torque and reluctance torque and its optimal efficiency control.

BACKGROUND OF THE INVENTION

In recent years, due to the advantages of high efficiency, high power factor and high torque density, permanent magnet motors have been attracting increasing interest in commercial electric vehicles.

The patent literature "Rotating Motor" with the publication number CN101741154A is proposed that compared with the surface mounted and the surface embedded structure, the embedded permanent magnet motor can utilize the reluctance torque to improve the torque performance and speed range. Meanwhile, the full utilization of the reluctance torque can effectively control the back EMF amplitude of the permanent magnet motor in the electric vehicle, which is beneficial to the operation of the motor under the fault condition. However, the output torque of the permanent magnet motor is composed of permanent magnet torque and reluctance torque, and they are output at the same time, so the permanent magnet torque and reluctance torque cannot be controlled independently.

The patent literature "Method for improving torque density of motor and radial and axial flux parallel permanent magnet motor" with the publication number CN104716754A is put forward which improves the torque density by combining radial and axial flux and putting surface mount permanent magnet on the radial and axial direction of rotor simultaneously. However, this scheme does not separate the radial and axial magnetic field and does not take into account the reluctance torque of the motor, so it cannot be used in wide speed range.

SUMMARY OF THE INVENTION

The aim of the invention is to overcome the disadvantages of the prior technology, and to provide a motor with separated permanent magnet torque and reluctance torque.

The technical scheme adopted in the device of the invention is: the motor with separated permanent magnet torque and reluctance torque comprises a casing, a radial motor inside of the casing, a left axial motor and a right axial motor. The two sides of the radial motor are surrounded by the left axial motor and the right axial motor, respectively. The radial motor comprises a radial stator (2-1) and a radial rotor (3-1). The integer slot distributed winding is adopted in radial stator (2-1) and the synchronous reluctance rotor is employed as radial rotor (3-1). Then, the radial motor only produces reluctance torque. The left axial motor comprises a left axial stator (2-3) and a left axial rotor (3-2). The right axial motor comprises a right axial stator (2-2) and a right axial rotor (3-3). In the left axial stator (2-3) and the right axial stator (2-2), the fractional slot concentrated windings are used. Meanwhile, the surface mounted permanent magnets (6) are fixed on the right axial rotor (3-3) and the left axial rotor. The excitation direction of the permanent magnet (6) is parallel to the axial direction of the motor, and the adjacent permanent magnets have opposite excitation directions. Then, the axial motor only produces permanent magnet torque. The radial motor can adopt an inner rotor or an outer rotor structure. In the left axial motor and the right axial motor, the left axial stator (2-3) and the left axial rotor (3-2) can interchange positions along axial direction, and the right axial stator (2-2) and the right axial rotor (3-3) can interchanges position along axial direction. The radial motor generates radial flux, while the left axial motor and the right axial motor generate axial magnetic flux. Then, the radial flux and axial flux are perpendicular to each other, resulting in the decoupling of radial flux and axial flux.

Further, the radial motor is an inner rotor structure. The inner ring of radial rotor is a shaft. The inner ring of radial stator is the radial rotor, and there is a radial air gap between them. The two sides of the end of radial rotor are connected with a left axial rotor and a right axial rotor, respectively. The left axial stator and the right axial stator are arranged on the outermost layer of the left axial rotor and the right axial rotor, respectively. The permanent magnets on the left axial rotor and the right axial rotor are arranged on the side close to the left axial stator and the right axial stator, respectively. The radial stator, the left axial stator and the right axial stator are mounted on the casing.

Further, the radial motor is an outer rotor structure, and the radial rotor can be directly installed in a wheel to form a hub structure. The inner ring of radial stator is the radial rotor, and there is a radial air gap between them. The two sides of the end of the radial rotor are set with a left axial rotor and a right axial rotor respectively. The left axial stator and the right axial stator are arranged on the outermost layer of the left axial rotor and the right axial rotor respectively. The permanent magnets on the left axial rotor and the right axial rotor are arranged on the side close to the left axial stator and the right axial stator respectively. The radial stator, the left axial stator and the right axial stator are connected to the shaft.

Further, the radial motor is an inner rotor structure. The inner ring of radial rotor is a shaft. The inner ring of radial stator is set with a radial rotor, and there is a radial air gap between them. The left axial stator and the right axial stator are placed along the axial direction, while the radial stator is nested in the core of the stator and the right axial stator along the axial direction. The left axial rotor and the right axial rotor are arranged on the outermost layer of the left axial stator arnd the right axial stator respectively. The permanent magnets on the left axial rotor and the right axial rotor are fixed on the side close to the left axial stator and the right axial stator respectively. The left axial stator and the right axial stator are arranged on the casing. The radial rotor, the left axial rotor and the right axial rotor are connected with the shaft.

Further, the radial stator adopts an integer slot distributed winding structure: the number of slots and the number of poles meet the formula $q=S/(2*P*m)$, and the value of q is integer. The right axial stator and the left axial stator adopt fractional slot concentrated winding structure: the number of slots and the number of poles meet the formula $S=2P\pm2$. Where m is the phase of motor, S is the slot number of motor, p is the pole of motor, q is the number of slots per pole of motor.

Further, the radial stator adopts an integer slot distributed winding structure: Slots and poles meet the formula $q=S/(2*P*m)$ where q is the number of slots per pole of motor. The right axial stator and the left axial stator adopt fractional slot concentrated winding structure: Slots and poles meet the formula S=2P±2. Where m is the phase of motor, S is the slot number of motor, p is the pole of motor, q is the number of slots per pole of motor.

Further, the outer diameter of the radial rotor (3-1) is larger than that of the left axial rotor (3-2) or the right axial rotor (3-3). The outer ratio of diameters between the left axial rotor (3-2) and the radial rotor (3-1) should be set in the range from 0.7 to 0.9.

Further, the outer diameters of the right axial rotor and the left axial rotor are equal, while the outer diameter of the radial rotor is unequal to the outer diameters of the left axial rotor and the right axial rotor. When the ratio of outer diameters between the radial rotor and the left axial rotor or the right axial rotor is fixed, the ratio of axial thickness between the radial rotor and the left axial rotor or the right axial rotor should be set in the range from 0.2 to 0.8.

The technical scheme of the method of this invention is as follow:

The optimal efficiency control for the proposed motor with separated permanent magnet torque and reluctance torque, which can be divided into three regions: the first region is the low speed region, the second region is the middle and the high speed region, the third region is the high speed region.

In the first region, permanent magnet torque is used as the main driving torque. And the torque produced by right axial stator, left and right axial stator, axial rotor, and left axial rotor plays a leading role.

In the second region, the permanent magnet torque and the reluctance torque drive together. And the radial motor, the left axial motor and the right axial motor are all involved to provide output torque.

In the third region, the reluctance torque is adopted as the main driving torque. And the torque produced by the radial stator and radial rotor plays a dominant role. Moreover, the axial stator and rotor can be used to charge the power source if the permanent magnetic torque is not needed in the drive system.

The optimal efficiency control of a single radial motor or a left axial motor or a right axis motor can be realized. First, the relationship between the dq currents and the inductances of the motor is built with the help of finite element software. Then, the relationship between them and the iron loss is built further. On the basis of the above relationships, the operational point of maximum efficiency is searched by adjusting the current angle. The essence of searching for maximum efficiency point is to find the right current angle for maximum efficiency. The current angle is always modified in the process of searching of the maximum efficiency point until the right current angle is found.

Further, the detail procedures of the optimal efficiency control for the proposed motor with separated permanent magnet torque and reluctance torque are as follows:

Step 1, according to the simulation results of a finite element model, a polynomial fitting is used to construct the polynomial relationship between the quadrature axis and the direct axis inductance ($L_q$ and $L_d$) and the quadrature axis and the direct axis current ($i_q$ and $i_d$) of the motor.

Step 2, the stator iron loss of the motor is modeled, and the relationship between ($P_{fe}$) and ($L_d$), ($L_q$), ($i_d$) and ($i_q$) is established;

Step 3, according the motor iron loss model and the d, q axis voltage equation of the motor, the equivalent resistance of the iron loss ($R_{Fe}$) is calculated.

Step 4, according the given current ($i_s$) and current angle ($\gamma$), the currents of d- and q-axis ($i_d$, $i_q$) are calculated.

Step 5, according the fitting polynomial with the given $i_d$ and $i_q$, the inductances of d- and q-axis ($L_d$, $L_q$) are calculated.

Step 6, according the inductances of d- and q-axis obtained by step 5, the voltages of d- and q-axis are calculated.

Steps 7, according the currents and voltages of d- and q-axis, the input and output powers are calculated.

Step 8, the motor efficiency is calculated to judge whether this efficiency is the biggest. If it is, the currents of d- and q-axis are obtained; if it is not, the current angle is modified and the process returns to step 4 for continue searching.

The effects of the invention are as follow:

1) The proposed motor includes 3 stators and 1 rotor (composed of 2 axial rotors and 1 radial rotor). Each stator and rotor of the motor can be processed independently and installed modularly, thereby this can reduce the manufacturing difficulty of the motor.

2) A distributed winding is adopted in the radial stator, and the axial stator use concentrated winding. The use of distributed winding and radial reluctance rotor structure is conductive to the generation of greater reluctance torque. The use of concentrated winding and the surface mounted permanent magnet structure can produce higher permanent magnetic torque. The axial magnetic circuit generates the permanent magnetic torque, and the radial magnetic circuit generates the reluctance torque. By using the decoupling of axial and radial magnetic circuits, the separation and the independent control of the permanent magnetic torque and the reluctance torque are realized.

3) The use of multi-layer air slot structure in radial rotor is beneficial to increase the reluctance torque. The surface mounted permanent magnet (the surface sticking coefficient of permanent magnet is between 0.8-1) on the axial rotor is beneficial to the improvement of permanent magnet torque. The independent optimization of permanent magnet torque and reluctance torque is helpful to break through the torque density of conventional motors.

4) The radiuses of the 2 axial rotors are equal, and the radius of the radial rotor is different from the 2 axial rotors. The radius ratio of the left axial and the radial rotor is between 0.7-0.9, which is to ensure the maximum permanent magnet torque output ability, also greatly suppress the end leakage flux.

5) Under the condition that the radial radius of radial and axial rotor is fixed, the changing of the axial thickness ratio of radial and axial rotor (the ratio of the axial thickness of the radial rotor to the left axial rotor or the right axial rotor should be set at 0.2-0.8) can quickly adjust the proportion of the reluctance torque and permanent magnet torque.

6) The optimal efficiency control is divided into three regions, which can make the motor obtain/possess the high efficiency characteristic of the surface mounted permanent magnet motor at low speed, the high efficiency characteristic of the interior permanent magnet motor in medium high speed area, the high efficiency characteristic of synchronous reluctance motor at high speed area. It also can reduce the loss of permanent magnet eddy current, and maximize the utilization ratio of the reluctance torque produced by the radial stator and rotor and the permanent magnet torque produced by the axial motor respectively, and furthermore achieve optimal efficiency control in different region.

BRIEF DESCRIPTION OF THE DRAWINGS

FIGS. 3(a)-3(d) are sketch maps of the radial rotor,

FIG. 4 is the sketch map of the permanent magnet and the excitation direction;

FIG. 5 is the magnetic circuit of the radial and axial; (a) is schematic partial structure diagram of the radial stator and rotor; (b) is the B-B sectional view of the radial stator and rotor, FIG. 6 is the simulation results chart of the magnetic circuit of the radial and axial; (a) is the magnetic circuit with no radial current; (b) is the magnetic circuit with radial current;

FIG. 1-9: where the shell is 1, the radial stator is 2-1; the right axial stator is 2-2, the left axial stator is 2-3, the radial rotor is 3-1; the left axial rotor is 3-2, the right axial rotor is the 3-3, the integer slot distributed winding is 4-1, the fractional slot concentrated winding is 4-3, the bearing is 7, the shaft is 8.

DETAILED DESCRIPTION OF THE INVENTION

This section will describe the technical scheme of the invention clearly and completely according to these figures of this invention.

The detailed description of the invention is as follows. The example of the implementation is shown in the figures. The same or similar labels from beginning to end indicate the same or similar elements or components having the same or similar functions. The following examples described by reference drawings are exemplary, only for the interpretation of the invention, and should not be interpreted as a limit to the invention.

The motor with separated permanent magnet torque and reluctance torque comprises a casing, a radial motor inside of the casing, a left axial motor and a right axial motor. The two sides of the radial motor are surrounded by the left axial motor and the right axial motor, respectively; the radial motor comprises a radial stator 2-1 and a radial rotor 3-1. The integer slot distributed winding is adopted in radial stator 2-1 and the synchronous reluctance rotor (with flat rotor, V type rotor, multi-layer air slot rotor or switched reluctance rotor structure) is employed as radial rotor 3-1. Then, the radial motor only produces reluctance torque. The left axial motor comprises a left axial stator 2-3 and a left axial rotor 3-2. The right axial motor comprises a right axial stator 2-2 and a right axial rotor 3-3. The left axial stator 2-3 and the right axial stator 2-2 use fractional slot concentrated winding. Meanwhile, the right axial rotor 3-3 and the left axial rotor 3-2 have surface mounted permanent magnets 6. The excitation direction of the permanent magnets 6 is parallel to the axial direction of the motor, and the adjacent permanent magnets have opposite excitation directions. Then, the axial motor only produces permanent magnet torque. The radial motor can adopt an inner rotor or an outer rotor structure. In the left axial motor and the right axial motor, the left axial stator 2-3 and the left axial rotor 3-2 can interchange positions along axial direction, the right axial stator 2-2 and a right axial rotor 3-3 can interchange positions along axial direction.

The right axial rotor 3-3 and the left axial rotor 3-2 have the same radiuses length, and the radius of the radial rotor 3-1 is different from that of the right axial rotor 3-3 and the left axial rotor 3-2, which is to restrain the radial and axial leakage flux and facilitate decoupling.

At the condition that the radius ratio of the radial rotor 3-1 with the left and right axial rotor 3-2, 3-3 is fixed, the axial thickness ratio of the radial rotor 3-1 and left axial rotor 3-2 should be set to 0.2-0.8, to adjust the proportional of the reluctance torque and permanent magnet torque.

Specific Example 1

Figure 1:
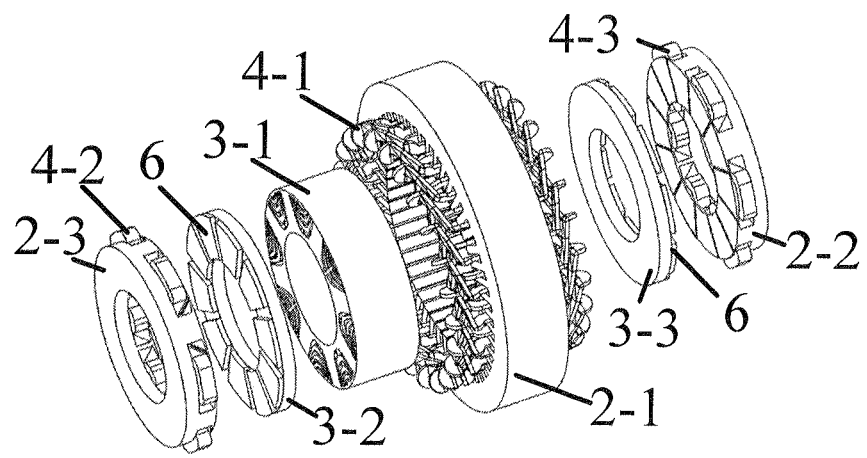
FIG. 1 is the structure explosion diagram of the specific example 1.

As shown in FIG. 1, the invention is a motor with separated permanent magnet torque and reluctance torque. The motor includes 3 stators and 3 rotors, 3 stators are: radial stator 2-1, right axial stator 2-2, left axial stator 2-3; the 3 rotors are: radial rotor 3-1, left axial rotor 3-2, and right axial rotor 3-3. The radial stator use the integer slot distributed winding 4-1, the left axial stator 2-3 use the fractional slot concentrated winding 4-2, and the right axial stator 2-2 use the fractional slot concentrated winding 4-3. The permanent magnets 6 are surface mounted on the left axial rotor 3-2 and the right axial rotor 3-3.

The radial motor uses inner rotor structure in this example. The inner ring of radial rotor 3-1 is a shaft 8. The inner ring of radial stator 2-1 is the radial rotor 3-1, and there is a radial air gap 5-1 between them. The two sides of the end of radial rotor 3-1 are connected with a left axial rotor 3-2 and a right axial rotor 3-3, respectively.

The left axial stator 2-3 and the right axial stator 2-2 are arranged on the outermost layer of the left axial rotor 3-2 and the right axial rotor 3-3, respectively. The permanent magnets on the left axial rotor 3-2 and the right axial rotor 3-3 are arranged on the side close to the left axial stator 2-3 and the right axial stator 2-2, respectively. The radial stator 2-1, the left axial stator 2-3 and the right axial stator 2-2 are mounted on the casing 1.

Figure 2:
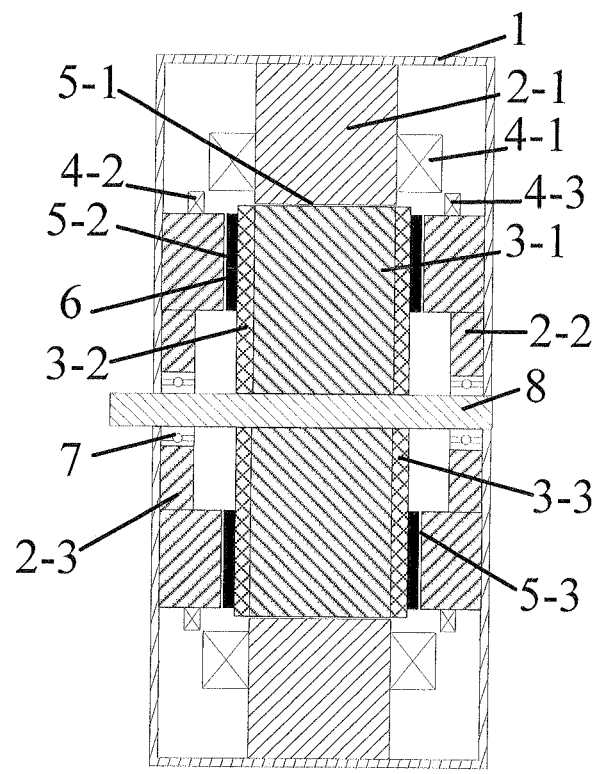
FIG. 2 is the assembly drawing of the specific example 1.

In order to further illustrate the structure of the motor, the axial section of the motor is presented, as shown in the FIG. 2. From the FIG. 2, the components in the radial direction of this motor from the inside to the outside are casing 1→radial stator 2-1→radial air gap 5-1→radial rotor 3-1 and shaft 8, the radial stator 2-1 and radial rotor 3-1 are connected by air gap 5-1. Meanwhile, the components in the axial direction of this motor from the inside to the outside are casing 1→left axial stator 2-3→axial air gap 5-2→permanent magnet 6→left axial rotor 3-2→radial rotor 3-1→right axial rotor 3-3→permanent magnet 6→axial air gap 5-3→axial stator 2-2. From the overall structure of the motor, the motor consists of 1 radial motor and 2 axial motors, but different from the traditional composite motor, the radial motors only produce reluctance torque and the axial motors only produce permanent magnet torque. Meanwhile, based on the design of radial and axial magnetic circuit, the permanent magnet torque and reluctance torque of the motor are separated. In this invention, the radial stator 2-1 using the distributed winding structure and the radial rotor 3-1 using the reluctance rotor with air slot structure is to make the radial motor only produce reluctance torque.

The air slot structure of the radial rotor can use the structures shown in FIGS. 3(a)-3(d). The reluctance rotor structures include: flat type rotor (flat type air slot is uniformly arranged along the rotor circumference), V type rotor (V type air slot is uniformly arranged along the rotor circumference), and multi-layer air slot rotor (multi trapezoidal air slot is evenly arranged along the circumference of the rotor) and switched reluctance rotor. The selection principle depends on the specific adoption of the reluctance torque, and the priority selection of this invention is a multi-layer air slot rotor. In order to make the left and right axial motor produce only permanent magnetic torque, the right axis stator 2-2 and the left axial stator 2-3 adopt fractional slot concentrated winding structure, meanwhile, the permanent magnets 6 are surface mounted on the right axial rotor 3-3 and the left axial rotor 3-2.

The excitation mode of the permanent magnets 6 in the axial direction is shown in FIG. 4. As can be seen from FIG. 4, the excitation directions of adjacent two permanent magnets 6 are parallel to the axial direction of the motor and opposite with each other. As an embodiment of the presented invention, the permanent magnets can be installed in three forms: surface mounted, surface embedded and Halbach array. The surface mounting coefficient of permanent magnet is between 0.8-1.

The right axial rotor 3-3 and the left axial rotor 3-2 have the same radiuses length. The outer diameter of the radial rotor 3-1 is larger than the outer diameter of the left axial rotor 3-2 and the right axial rotor 3-3. In order to ensure the output ability of permanent magnet torque and the suppression of magnetic flux leakage at the end, the outer diameter ratio of the left axial rotor 3-2 and the radial rotor 3-1 is set in the range of 0.7-0.9.

The permanent magnet torque and reluctance torque are separated on the magnetic circuit, which is beneficial to adjust the proportion of the reluctance torque and permanent magnetic torque. When the radial radius ratio of the radial rotor and the axial rotor is fixed, the radial rotor and the axial rotor axial thickness ratio should be set in the range of 0.2-0.8.

The specific magnetic circuit of the radial and axial motor is shown in FIGS. 5(a)-5(b). As can be seen from FIGS. 5(a)-5(b), in the radial magnetic circuit, the magnetic circuit generated by the radial stator 2-1 links with the air slots in the radial rotor 3-1. The difference of the d, q axis inductances of the radial rotor 3-1 contributes to produce torque. There is no permanent magnet on the radial rotor 3-1. In the axial magnetic circuit, the magnetic circuit generated by the axial stator 2-3 links with the permanent magnets 6 on the right axial rotor 3-3, the output torque is generated by the interaction between the armature winding flux and the permanent magnetic flux linkage, so the output torque is the permanent magnet torque. In order to ensure the decoupling of permanent magnet torque and reluctance torque, the decoupling of radial and axial magnetic circuits must be ensured under the condition of no-load and load.

Figure 7:
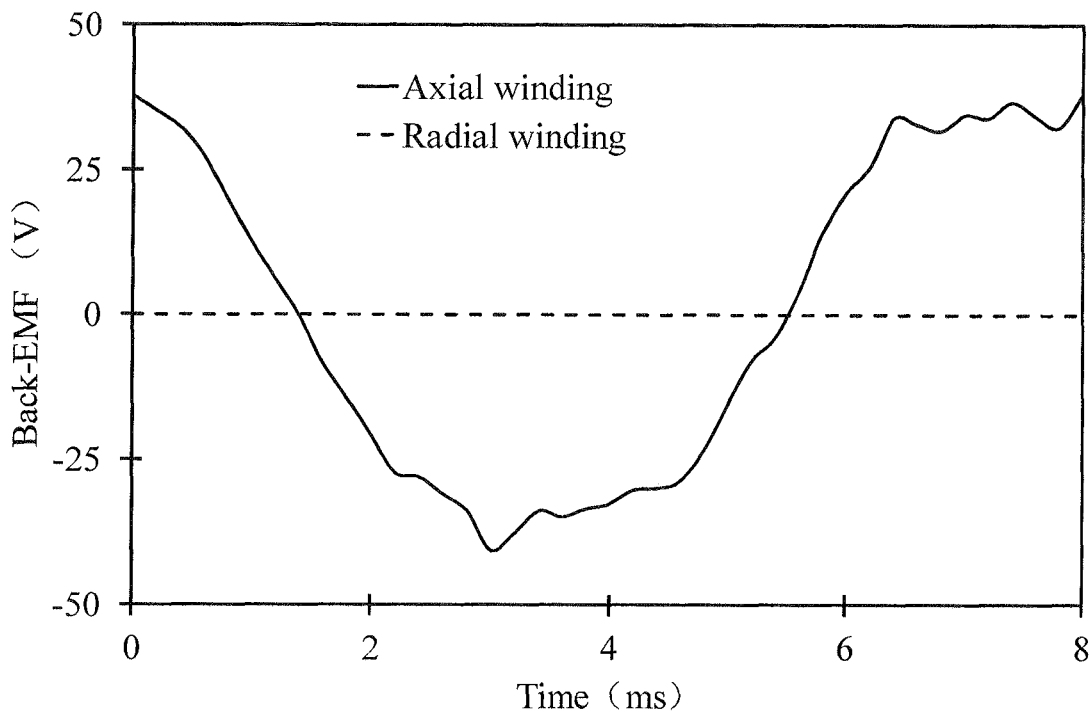
FIG. 7 is the simulation results chart of the EMF; (a) is the EMF with no radial current; (b) is the EMF of the fractional slot concentrated winding.
Figure 7:
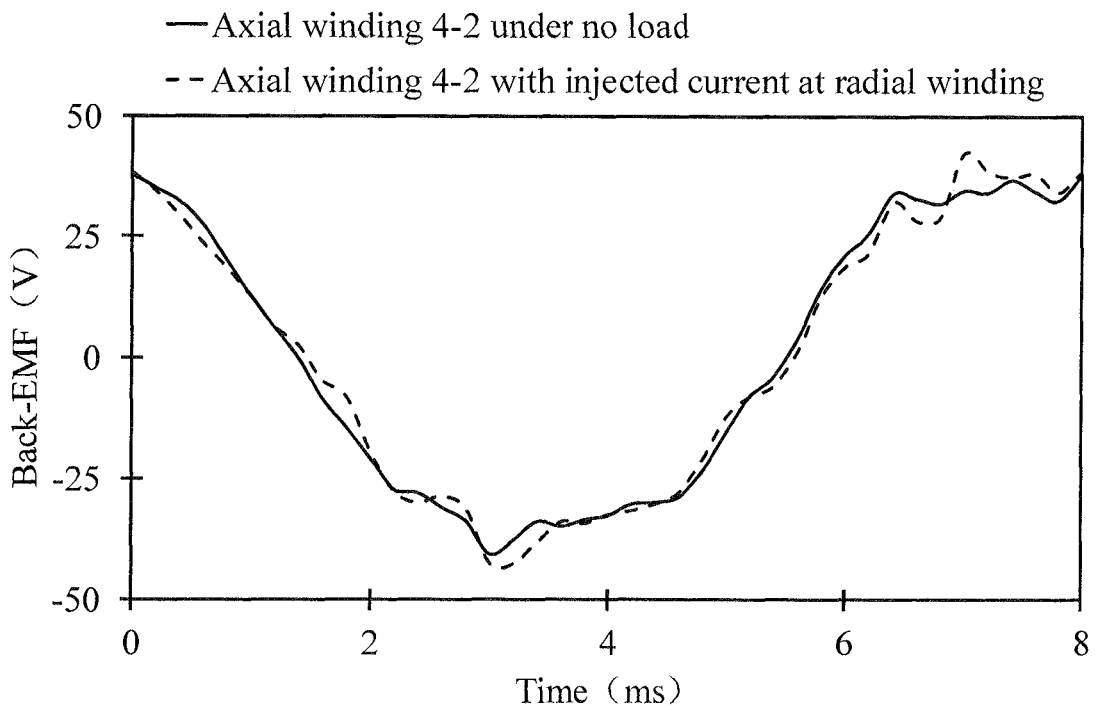

FIGS. 6(a)-6(b) show the distribution of the magnetic field of the motor under the condition of no-load and radial current. As can be seen from the FIG. 6, in the case of no-load, the motor only has axial flux path, meaning that the flux generated by permanent magnet 6 will not pass through the radial stator 2-1. From the motor's flux distribution after the current passes through the radial integral slot distributed winding 4-1, it can be seen that the motor has both the axial flux path and radial flux path, and the directions of them are perpendicular to each other, it means the decoupling of the radial and axial flux is achieved. In order to accurately explain the radial and axial decoupling effect, the EMF changes of the fractional slot concentrated winding 4-2 and integer slot distributed winding 4-1 under the condition of no load as well as radial integer slot distributed winding 4-1 applied current have been given in FIGS. 7(a)-7(b). As can be seen in FIG. 7, under no-load condition, the back EMF exists in the fractional slot concentrated winding 4-2 and turns out 0 in the integer slot distributed winding 4-1. Thus, the flux linkage produced by the permanent magnet is only connected with the right axial stator 2-2 and the left axial stator 2-3, and no flux through radial stator 2-1. In the case of radial integer slot distributed winding 4-1 applied current, the back EMF of the fractional slot concentrated winding 4-2 is more consistent with the no-load, which illustrate the validity of the decoupling of radial and axial magnetic circuits, and prove that this invention is a motor with separated permanent magnet torque and reluctance torque.

Specific Example 2

Figure 8:
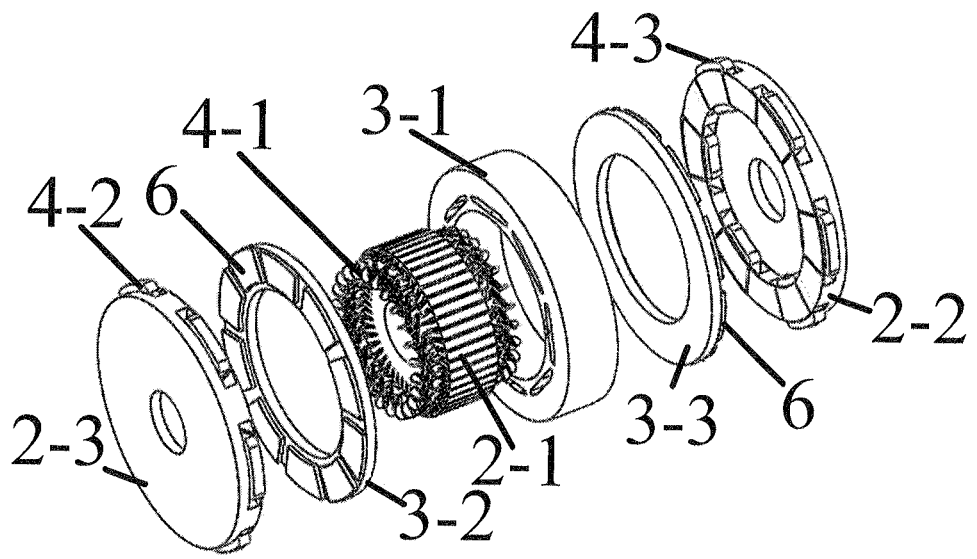
FIG. 8 is the structure explosion diagram of the specific example 2.

As shown in FIG. 8, the invention is a motor with separated permanent magnet torque and reluctance torque. The motor includes 3 stators and 3 rotors, the 3 stators are: radial stator 2-1, right axial stator 2-2, left axial stator 2-3; the 3 rotors are: radial rotor 3-1, left axial rotor 3-2, and right axial rotor 3-3.

The radial motor of this specific example is an outer rotor structure, and the radial rotor 3-1 can be directly installed in the wheel to form a hub structure. The inner ring of radial stator 2-1 is the radial rotor 3-1, and there is a radial air gap 5-1 between them. The two sides of the end of the radial rotor 3-1 are set with a left axial rotor 3-2 and a right axial rotor 3-3 respectively. The left axial stator 2-3 and the right axial stator 2-2 are arranged on the outermost layer of the left axial rotor 3-2 and the right axial rotor 3-3 respectively. The permanent magnets on the left axial rotor 3-2 and the right axial rotor 3-3 are arranged on the side close to the left axial stator 2-3 and the right axial stator 2-2 respectively. The radial stator 2-1, the left axial stator 2-3 and the right axial stator 2-2 are connected to the shaft 8.

The radial stator 2-1 adopts the integer slot distributed winding 4-1, the left axial stator 2-3 adopts the fractional slot concentrated winding 4-2 and the right axial stator 2-2 adopts the fractional slot concentrated winding 4-3. The permanent magnet 6 is surface mounted to the left axial rotor 3-2 and the right axial rotor 3-3. The components in the radial direction of this motor from the inside to the outside are casing 1→radial rotor 3-1→radial air gap→radial stator 2-1 and shaft 8, the radial stator 2-1 and radial rotor 3-1 are connected by air gap 5-1. Meanwhile, the components in the axial direction of this motor from the inside to the outside are casing 1→left axial stator 2-3→axial air gap→permanent magnet 6→left axial rotor 3-2→radial rotor 3-1→right axial rotor 3-3→permanent magnet 6→axial air gap 5-3→axial stator 2-2. Compared with the specific example 1, the axial-radial inner rotor of the motor is transformed into an outer rotor structure.

In the specific example 1 and specific example 2, Radial rotor 3-1, left axial stator 2-3 and left axial rotor 3-2 are connected to shaft 8. The radial stator 2-1, the left axial stator 2-3 and the right axial stator 2-2 are mounted on the casing 1. The right axial rotor (3-3) and the left axial rotor (3-2) have the same radius. The outer diameter of the radial rotor (3-1) is a little larger than the outer diameter of the left axial rotor (3-2) and the right axial rotor (3-3). In order to ensure the output permanent magnet torque and the suppression of magnetic flux leakage at the end, the outer diameter ratio of the left axial rotor (3-2) and the radial rotor (3-1) is 0.7-0.9.

Specific Example 3

Figure 9:
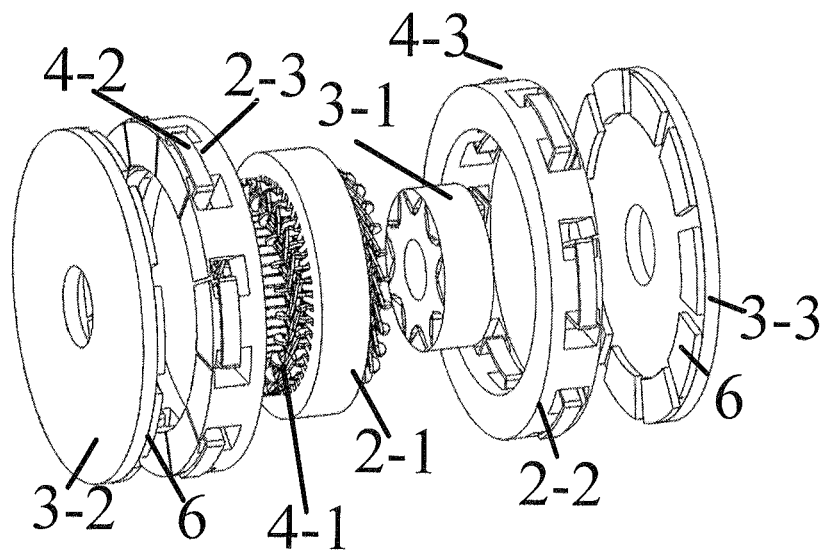
FIG. 9 is the structure explosion diagram of the specific example 3.

As shown in FIG. 9, the invention is a motor with separated permanent magnet torque and reluctance torque. The motor includes 3 stators and 3 rotors, 3 stators are: radial stator 2-1, right axial stator 2-2, left axial stator 2-3; the 3 rotors are: radial rotor 3-1, left axial rotor 3-2, and right axial rotor 3-3.

The motor of this specific example is inner rotor structure. The inner ring of radial rotor 3-1 is a shaft 8, the inner ring of radial stator 2-1 is the radial rotor 3-1, and there is a radial air gap 5-1. The left axial stator 2-3 and the right axial stator 2-2 are arranged side by side along the axial direction, meanwhile, the radial stator 2-1 is nested along the axial direction at the inner axis of the left axial stator 2-3 and the right axial stator 2-2. The left axial rotor 3-2 and the right axial rotor 3-3 are arranged on the outermost layer of the left axial stator 2-3 and the right axial stator 2-2, respectively. The permanent magnets on the left axial rotor 3-2 and the right axial rotor 3-3 are arranged on the side close to the left axial stator 2-3 and the right axial stator 2-2, respectively. The left axial stator 2-3 and the right axial stator 2-2 are mounted on the casing 1. The radial stator 2-1, the left axial stator 2-3 and right axial stator 2-2 connect with shaft 8.

The radial stator 2-1 adopts the integer slot distributed winding 4-1, the left axial stator 2-3 adopts the fractional slot concentrated winding 4-2 and the right axial stator 2-2 adopts the fractional slot concentrated winding 4-3. The permanent magnet 6 is surface mounted on the left axial rotor 3-2 and the right axial rotor 3-3. The components in the radial direction of this motor from the inside to the outside are casing 1→left axial stator 2-3 and right axial stator 2-2→radial stator 2-1→radial air gap→radial rotor 3-1→shaft 8, the radial stator 2-1 is embedded along the axial direction in the middle position of the left axial stator 2-3 and the right axial stator 2-2, the radial stator 2-1 and radial rotor 3-1 are separated by air gap. Meanwhile, the components in the axial direction of this motor from the inside to the outside are casing 1→left axial rotor 3-2→permanent magnet 6→axial air gap→left axial stator 2-3→radial rotor 3-1→axial stator 2-2→permanent magnet 6→right axial rotor 3-3. The motor combines the advantage of the specific example 1 and specific example 2, have radial inner rotor and axial outer rotor, the motor facilitates the combination of axial and radial stators.

Optimal Efficiency Control Method:

In the interior permanent magnet motor, the control strategy of maximum torque per ampere control can be used to reduce the current of the motor and ensure the high efficiency at the rated operating point, which is in the middle and high speed area.

While in the low speed and high speed region, the permanent magnetic torque and the reluctance torque cannot be controlled separately due to the coupling between them.

So the highest efficiency for the motor in these areas can't guarantee. In the proposed motor with separated permanent magnet torque and reluctance torque, the permanent magnet torque and reluctance torque can be controlled independently. Thus, it is possible to improve the operating efficiency of the motor under different operating conditions (low speed, medium speed and high speed).

An optimal efficiency control is put forward in this invention. The control method is divided into three sections: the first section is the low speed region, the middle and the high speed area is the second region, and the third region is the high speed region.

In the first region, permanent magnet torque is used as the main driving torque.

And the torque produced by right axial stator 2-2, left and right axial stator 2-3 3-3 and left axial rotor 3-2 plays a leading role.

In the second region, the permanent magnet torque and the reluctance torque drive the motor together. The radial motor, the left axial motor and the right axial motor are all involved in torque output.

In the third region, the reluctance torque is adopted as the main driving torque. And the torque produced by the radial stator 2-1 and radial rotor 3-1 plays a dominant role. Moreover, the axial stator and rotor can be used to charge the power source if the permanent magnetic torque is not needed in the drive system.

The optimal efficiency control of a single radial motor or a left axial motor or a right axis motor can be realized. First, the relationship between the dq currents and the inductances of the motor is built with the help of the finite element software. Then, the relationship between them and the iron loss is built further. The essence of searching for the maximum efficiency point is to find the best current angle. So on the basis of the above relationships, the operational point of maximum efficiency can be searched by adjusting the current angle. The current angle is always modified in the process of searching of the maximum efficiency point until it is found.

The detail procedures of the optimal efficiency control for the proposed motor with separated permanent magnet torque and reluctance torque are listed as follows:

Step 1, according to the simulation results of the finite element model, the polynomial fitting is used to construct the polynomial relationship between the quadrature axis and the direct axis inductance ($L_q$ and $L_d$) and the quadrature axis and the direct axis current ($i_q$ and $i_d$) of the motor.

Step 2, the stator iron loss of the motor is modeled, and the relationship between ($P_{fe}$) and ($L_d$), ($L_q$), ($i_d$) and ($i_q$) is established;

Step 3, according to the motor iron loss model and the d, q axis voltage equation of the motor, the equivalent resistance of the iron loss ($R_{Fe}$) is calculated.

Step 4, according the given current ($i_s$) and current angle (γ), the currents of d- and q-axis ($i_d$, q) are calculated.

Step 5, according the fitting polynomial with the given $i_d$ and $i_q$, the inductances of d- and q-axis ($L_d$, $L_q$) are calculated.

Step 6, according the inductances of d- and q-axis obtained by step 5, the voltages of d- and q-axis are calculated.

Steps 7, according the currents and voltages of d- and q-axis, the input and output powers are calculated.

Step 8, the motor efficiency is calculated to judge whether this efficiency is the biggest. If it is, output the currents of d- and q-axis; if it is not, the current angle is modified and the process returns to step 4 for continue searching.

The detailed description of the optimal efficiency control of the invention is shown as follows.

Figure 10A:
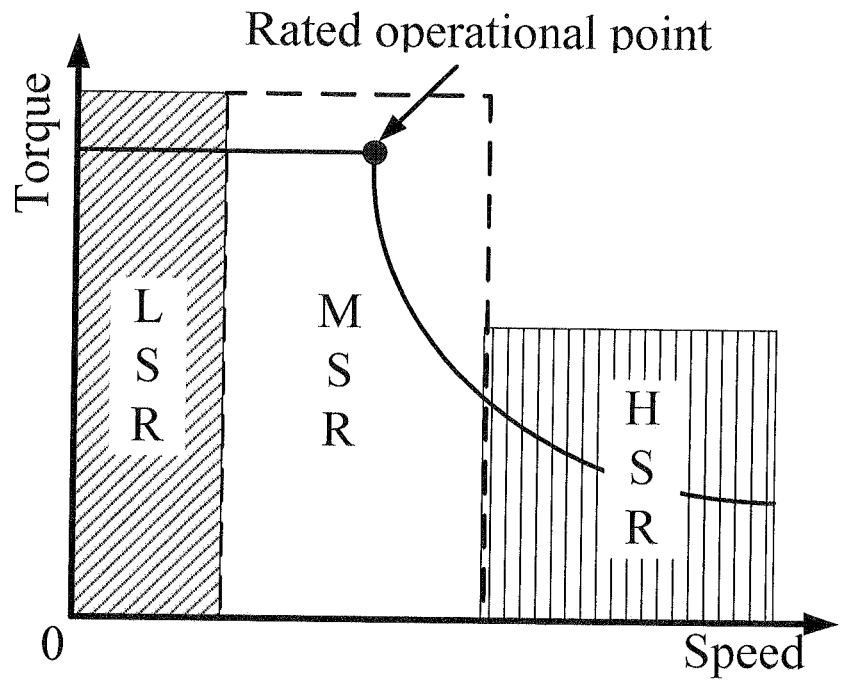
FIG. 10 is the three segment torque distribution diagram; (a) is the region division; (b) is the low speed region; (c) is the high speed region.
Figure 10B:
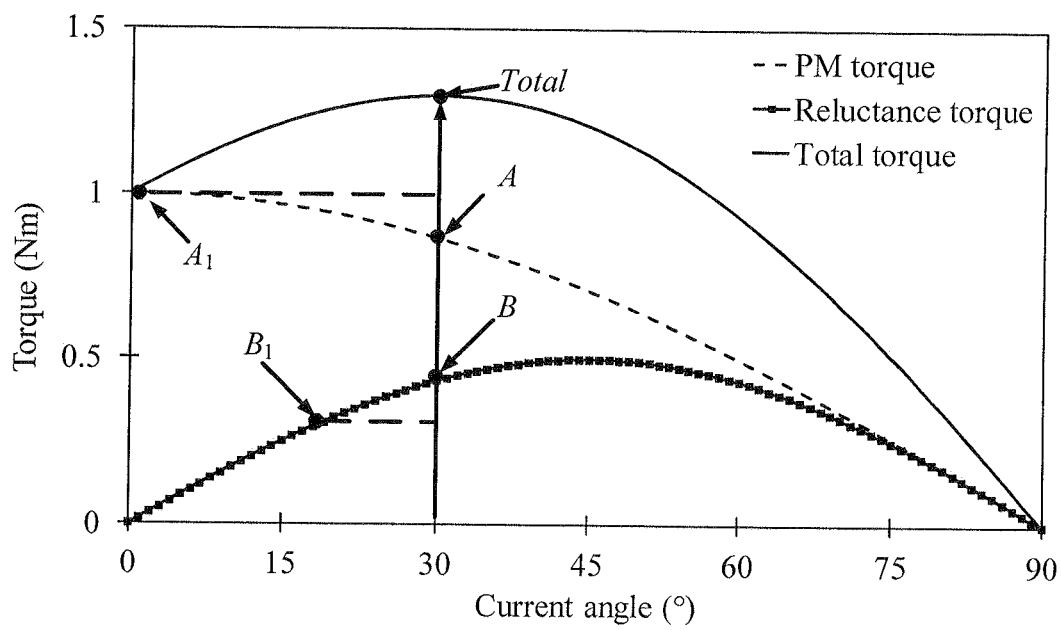
Figure 10C:
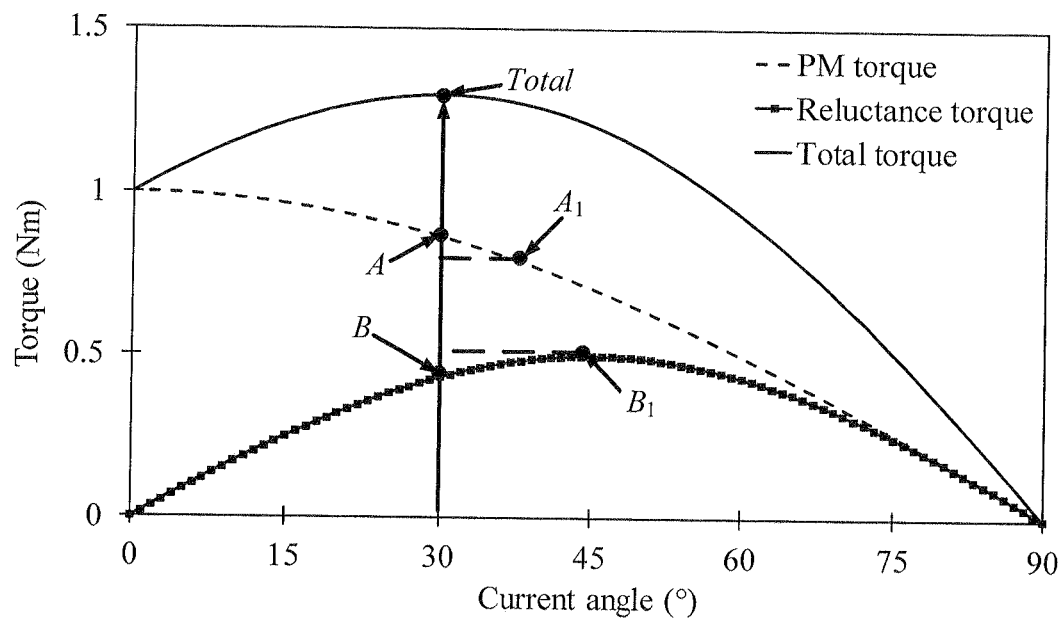
Figure 11:
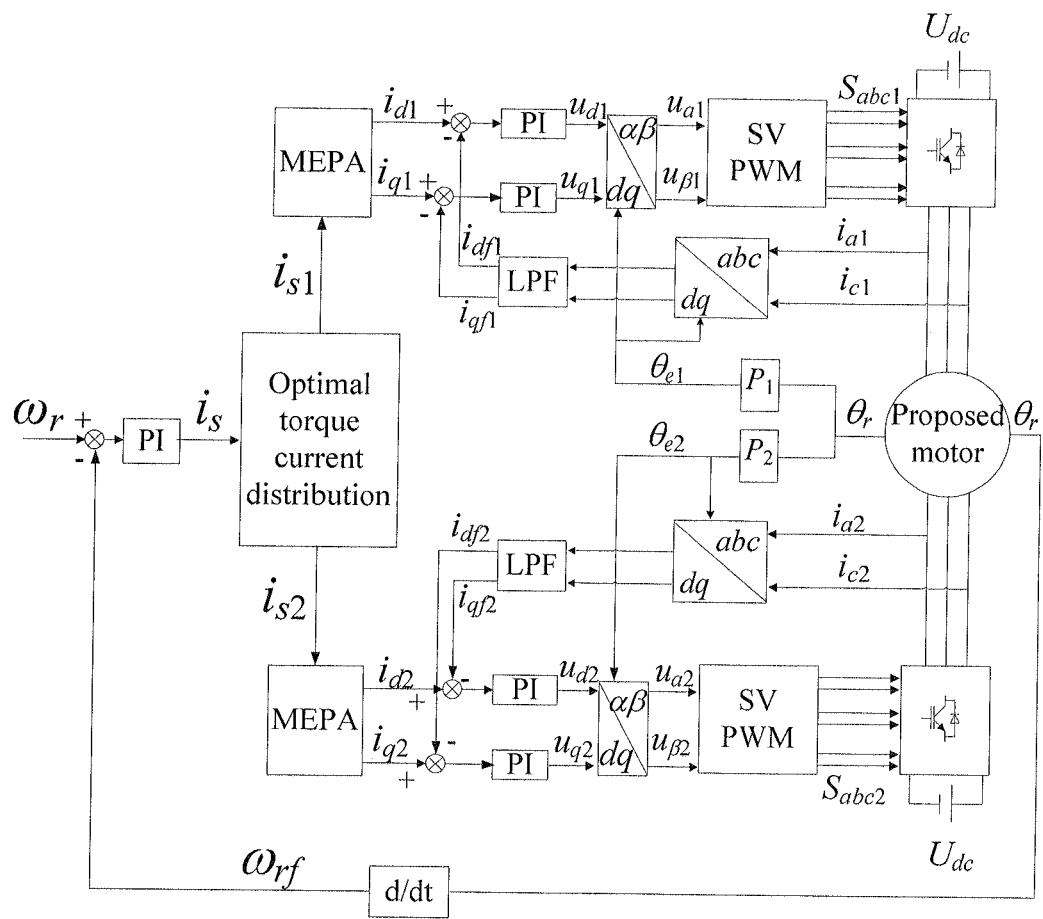
FIG. 11 is MEPA control chart based on optimal torque and current distribution.
Figure 12:
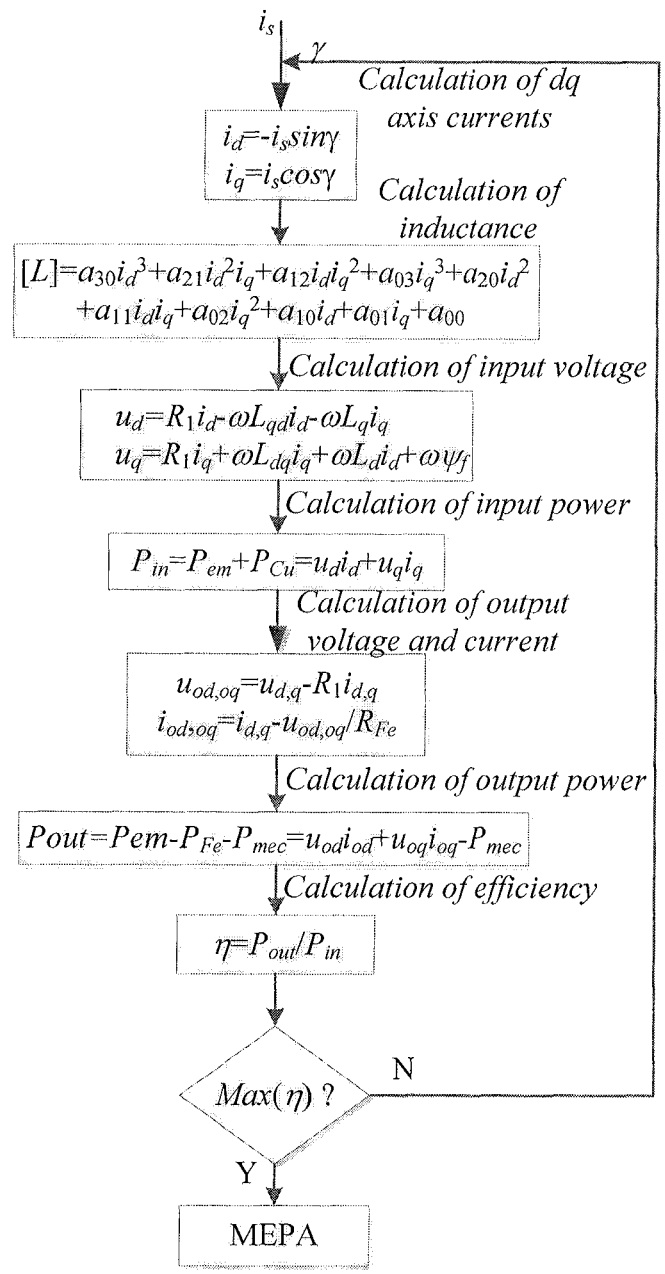
FIG. 12 is the MEPA control chart of on motor.

As shown in FIG. 10 (*b*), at low speed area, the torque of the traditional interior permanent magnet motor is composed of A point and B point, in the proposed motor torque can be composed of A1 points and B1 points. At this time, the permanent magnet torque produced by the right axial stator 2-2, left axial stator 2-3, left axial rotor 3-2, the right axis rotor 3-3 plays a leading role. And by increasing the utilization rate of the permanent magnet torque, the current value of the reluctance torque produced by the radial stator 2-1 and radial rotor 3-1 can be reduced, further the copper consumption is reduced in the region and the maximum efficiency of per ampere (MEPA) control is achieved. In the high speed region, in order to reduce the eddy current loss of permanent magnet, the utilization of the reluctance torque produced by the radial stator 2-1 and the radial rotor 3-1 can be maximized, as shown in FIG. 10 (c), the A point of the permanent magnet torque is transferred to the A1 point and the B point of the reluctance torque is transferred to the BI point, thus, the utilization ratio of the permanent magnetic torque decreases to reduce the eddy current loss of the permanent magnet motor and achieve MEPA control in the high speed region. Then the torque synthesis can be realized in different working conditions and the MEPA control can be achieved. The control block diagram of the whole system is shown in FIG. 11. In order to achieve the optimal efficiency of the whole system, two-level control is adopted. The specific implementation of the function of the main controller is shown in FIGS. 10(a)-10(c), mainly to achieve the optimal allocation of current in full operation mode; based on the current required by the radial and axial motor, the auxiliary controller can achieve the MEPA control for the single motor. The MEPA implementation of a single motor is shown in FIG. 12, and the specific steps are described as follows:

Step 1: set up the model of the proposed motor model with separated permanent magnet torque and reluctance torque in Ansoft software, the parameters of the dq axis inductances of the motor are obtained by simulation. Using MATLAB curve fitting toolbox, the value of the coefficient $a_{30}, a_{21}, a_{12}, a_{03}, a_{20}$ can be obtained through curve fitting of the polynomial (1) based on the simulation results of the finite element model.

$$[L] = a_{30}i_d^3 + a_{21}i_d^2 i_q + a_{12}i_d i_q^2 + a_{03}i_q^3 + a_{20}i_d^2 \quad (1)$$

Where $i_d$ and $i_q$ are the d, q axis current respectively.

Step 2: model the motor stator iron loss:

$$P_{Fe} = dP_{Fetd,q} V_t + dP_{Fejd,q} V_j \quad (2)$$
$$= k_{hd}(\psi_d^2 + \psi_q^2) + k_{ep}(\psi_d^{1.5} + \psi_q^{1.5})$$
$$= k_{hd}[(L_d i_d + \psi_f + L_{dq} i_q)^2 + (L_d i_d + L_{dq} i_q)^2] +$$
$$k_{ep}[(L_d i_d + \psi_f + L_{dq} i_q)^{1.5} + (L_d i_d + L_{dq} i_q)^{1.5}]$$

Where $\psi_d$, $\psi q$ is the dq axis flux linkage, $\psi_f$ is the Permanent magnetic flux linkage, $L_d$, $L_q$ are the dq axis self-inductance, $L_{dq}$ is the dq axis mutual inductance, $k_{hd}$ is the coefficient of equivalent iron hysteresis and eddy loss in loss model $k_{eq}$ is the coefficient of equivalent iron excess loss in loss model.

The expressions of the parameters $k_{hd}$ and $k_{eq}$ are:

$$\begin{cases} k_{hd} = \left(k_h f + \pi^2 \sigma \frac{k_d^2}{6} f^2\right)\left(\frac{V_t}{S_{tc}^2} + \frac{V_j}{S_{jc}^2}\right) \\ k_{ep} = k_e f^{1.5}\left(\frac{V_t}{S_{tc}^{1.5}} + \frac{V_j}{S_{jc}^{1.5}}\right) \end{cases} \quad (3)$$

Where $S_{tc}$, $S_{jc}$ are equivalent areas of stator tooth and yoke for flux density calculation, $V_t$, $V_j$ are the total volumes of stator and yoke, f is the frequency, σ is the conductivity of the material, $k_d$ is the thickness of laminations, $k_h$ and $k_e$ are the coefficients of hysteresis loss and excess loss.

Step 3: according to the motor iron loss model and the d and q axis voltage equations, calculate equivalent resistance $R_{Fe}$.

$$R_{Fe} = \frac{\omega^2}{k_{hd}} \quad (4)$$

Where ω is the electric angular velocity.

Step 4: according to the given current $i_s$ and current angle γ calculate d, q axis current $i_d$, $i_q$.

$$i_d = -i_s \sin \gamma$$
$$i_q = i_s \cos \gamma \quad (5)$$

Step 5: substituting the d, q axis current into the fitting polynomial (1), solve the motor d, q axis inductance in the case of given $i_d$ and $i_q$.

$$[L] = a_{30}i_d^3 + a_{21}i_d^2 i_q + a_{12}i_d i_q^2 + a_{03}i_q^3 + a_{20}i_d^2 + a_{11}i_d i_q + a_{02}i_q^2 + a_{10}i_d + a_{01}i_q + a_{00} \quad (6)$$

Step 6: use the calculated d, q axis inductances to calculate the d, q axis voltage equations.

$$\begin{cases} u_d = \frac{d\psi_d}{dt} - \omega\psi_q + R_1 i_d = R_1 i_d - \omega L_{qd} i_d - \omega L_q i_q \\ u_q = \frac{d\psi_q}{dt} + \omega\psi_d + R_1 i_q = R_1 i_q + \omega L_{dq} i_q + \omega L_d i_d + \omega\psi_f \end{cases} \quad (7)$$

Where, $R_1$ is the phase resistance.

Step 7: use d, q axis voltage equations to calculate the motor input power Pin.

$$P_{in} = P_{em} + P_{Cu} = u_d i_d + u_q i_q \quad (8)$$

Where $P_{em}$, $P_{cu}$ are the electromagnetic power and the stator copper loss respectively.

Step 8: through d, q axis voltage equations, calculate the d, q axis output voltage and current.

$$u_{od,oq} = u_{d,q} - R_i i_{d,q}$$
$$i_{od,oq} = i_{d,q} - u_{od,oq}/R_{Fe} \quad (9)$$

Where $R_{Fe}$ is equivalent resistance.

Step 9: use output voltage and current to calculate the output power $P_{out}$.

$$P_{out} = P_{em} - P_{Fe} - P_{mec} = u_{od} i_{od} + u_{oq} i_{oq} - P_{mec} \quad (10)$$

Where $P_{mec}$ is the friction or mechanical loss.

Step 10: use the input power $P_{in}$ and output power of $P_{out}$ to calculate the motor efficiency q.

$$\eta = \frac{u_{od} i_{od} + u_{oq} i_{oq} - P_{mec}}{u_d i_d + u_q i_q} \quad (11)$$

Step 11: judge whether the efficiency is the biggest, if it is, output d, q axis current $i_d$ and $i_q$; if not, modify the current angle, return to step four to continue.

In summary, a separation method of permanent magnet torque and reluctance torque is put forward in this invention. The separation method can realize the independent use of the radial flux and the axial flux based on the independent decoupling of radial flux and axial flux. The proposed motor with separated permanent magnet torque and reluctance torque includes 3 stators and 1 rotor (composed of 2 axial rotors and 1 radial rotor), the radial stator employs distributed winding, the axial stator adopts concentrated winding. The distributed winding and the radial reluctance rotor structure help to generate higher reluctance torque, while the concentrated winding and the surface mount permanent magnet structure offer higher permanent magnet torque. In the structure of the magnetic circuit, the axial magnetic circuit generates the permanent magnetic torque, and the radial magnetic circuit generates the reluctance torque. By using the decoupling of axial and radial magnetic circuits, the separation and independent control of the permanent magnetic torque and the reluctance torque are realized. Based on the separation of permanent magnet torque and reluctance torque, the high efficiency control method presented by this invention can be realized. The control method is divided into three sections: the first section is the low speed region, the middle and the high speed area is the second region, the third region is the high speed area. The control method can guarantee the motor with the high efficiency characteristic of the surface mounted permanent magnet motor in the low speed region, the high efficiency characteristic of the interior permanent magnet motor in the middle-high speed region and the high efficiency characteristic of the synchronous reluctance motor in the high speed region.

In the specification description, the description of reference terms "one embodiment", "in some cases" and "exemplary embodiment", "sample", "example", or "examples" means that combining the examples or samples in this invention, the specific features, structures, materials or characteristics are included in at least one embodiment or example of the invention. In the specification, a schematic representation of the term may not necessarily refer to the same examples or examples. Furthermore, the specific features, structures, materials, or characteristics of the description can be combined in a suitable manner in any one or more embodiments or examples.

Although the special example of this invention has been shown and described, the ordinary technical personnel in the field can understand: the examples in this invention can be changed, modified, replaced and varied in various ways only if the principle and the theory of this invention are not departed, and the scope of the presented invention is defined by the claims and its equivalents.

The invention claimed is:

1. A motor with separated permanent magnet torque and reluctance torque, said motor comprising a casing, a radial motor inside the casing, a first axial motor and a second axial motor, the radial motor comprising the first axial motor and the second axial motor, respectively;
   wherein the radial motor comprises a radial stator and a radial rotor, wherein an integer slot distributed winding is adopted in the radial stator and a synchronous reluctance rotor is employed as the radial rotor, wherein the radial motor is adapted to produce only reluctance torque;
   wherein the first axial motor comprises a first axial stator and a first axial rotor, and the second axial motor comprises a second axial stator and a second axial rotor, and wherein in the first axial stator and the second axial stator, fractional slot concentrated windings are used;
   wherein surface mounted permanent magnets are fixed on the second axial rotor and the first axial rotor, said permanent magnets having excitation directions parallel to an axial direction of the motor, and adjacent permanent magnets have opposite excitation directions, whereupon the axial motor only produces permanent magnet torque;
   wherein the radial motor is adapted for either an inner rotor or an outer rotor structure, wherein the first axial motor and the second axial motor, and the first axial stator and the first axial rotor being interchangeable in positions along the axial direction, and the second axial stator and a second axial rotor being interchangeable in positions along the axial direction, whereupon the radial motor generates radial flux, while the first axial motor and the second axial motor generate axial magnetic flux, and the radial flux and axial flux are perpendicular to each other, resulting in the decoupling of radial flux and axial flux; and
   wherein outer diameters of the second axial rotor and the first axial rotor are equal, while an outer diameter of the radial rotor is unequal to and larger than the outer diameters of the first axial rotor and the second axial rotor;
further comprising one or more of the following features:
the control method is divided into three regions: the first section is the low speed region, the middle and the high speed area is the second region, the third region is the high speed area;
in the first region, permanent magnet torque is used as the main driving torque, and the torque produced by second axial stator, the first and second axial stator axial rotors, and the first axial rotor plays a leading role;
in the second region, the permanent magnet torque and the reluctance torque are the driving torque together, and the radial motor, the first axial motor and the second axial motor are all involved to provide output torque;
in the third region, the reluctance torque is adopted as the main driving torque, the torque produced by the radial stator and radial rotor plays a dominant role, and the axial stator and rotor is adapted to be used to charge the power source if the permanent magnet torque is not needed in the drive system; and
an optimal efficiency control of a single radial motor or a first axial motor or a second axial motor are achieved, wherein a first relationship between dg currents and the inductances of the motor is built with the help of finite element software, a second relationship between them and iron loss is built, and, on a basis of the first and second relationships, an operation point of maximum efficiency is determined by adjusting the current angle, wherein an essence of searching for maximum efficiency point is to find the right current angle for maximum efficiency, and the current angle is modified by searching the maximum efficiency point until the right current angle is found; and, wherein optimal efficiency control for the motor is achieved as follows:
A Step 1, in which a simulation results of a finite element model, the polynomial fitting is used to construct the polynomial relationship between the quadrature axis and the direct axis inductance ($L_q$ and $L_d$) and the quadrature axis and the direct axis current ($i_q$ and $i_d$) of the motor;
A Step 2, in which stator iron loss of the motor is modeled, and a relationship between ($P_{fe}$) and ($L_d$), ($L_q$), ($i_d$) and ($i_q$) is established;
A Step 3, in which using the motor iron loss model and the d, q axis voltage equation of the motor, an equivalent resistance of the iron loss ($R_{Fe}$) is calculated;
A Step 4, in which the given current ($i_s$) and current angle ($\gamma$), the currents of d- and q-axis ($i_d, i_q$) are calculated;
A Step 5, in which a fitting polynomial with the given $i_d$ and $i_q$, the inductances of d- and q-axis ($L_d, L_q$) are calculated;

A Step 6, in which inductances of d- and q-axis obtained by step 5, the voltages of d- and q-axis are calculated;

A Step 7, in which currents and voltages of d- and q-axis, the input and output powers are calculated; and A Step 8, in which motor efficiency is calculated and judged whether it is the biggest, and if it is, the currents of d- and q-axis is obtained; and if it is not, the current angle is modified and the process returns to Step 4 and repeated.

2. The motor of claim 1, characterized by one or more of the following features:
the radial motor is an inner rotor structure;
the inner ring of radial rotor is a shaft, the inner ring of radial stator is the radial rotor, and there is a radial air gap between them;
the two sides of the end of radial rotor are connected with a first axial rotor and a second axial rotor, respectively;
the first axial stator and the second axial stator are arranged on an outermost layer of the first axial rotor and the second axial rotor, respectively;
the permanent magnets on the first axial rotor and the second axial rotor are arranged on the side respectively close to the first axial stator and the second axial stator; and
the radial stator, the first axial stator and the second axial stator are mounted on the casing.

3. The motor of claim 1, characterized by one or more of the following features:
the radial motor is an outer rotor structure, and the radial rotor is adapted to be directly installed in a wheel to form a hub structure;
the inner ring of radial stator is the radial rotor, and there is a radial air gap between them;
the two sides of the end of the radial rotor are set with a first axial rotor and a second axial rotor respectively;
the first axial stator and the second axial stator are arranged on the outermost layer of the first axial rotor and the second axial rotor respectively;
the permanent magnets on the first axial rotor and the second axial rotor are arranged on the side respectively close to the first axial stator and the second axial stator respectively; and
the radial stator, the first axial stator and the second axial stator are connected to the shaft.

4. The motor of claim 1, characterized by one or more of the following features:
the radial motor is an inner rotor structure;
the inner ring of radial rotor is a shaft;
the inner ring of radial stator is set with a radial rotor, and there is a radial air gap between them;
the first axial stator and the second axial stator are placed along the axial direction, while the radial stator is nested in the core of the stator and the second axial stator along the axial direction;
the first axial rotor and the second axial rotor are arranged on the outermost layer of the first axial stator and the second axial stator respectively;
the permanent magnets on the first axial rotor and the second axial rotor are fixed on the side close to the first axial stator and the second axial stator respectively;
the first axial stator and the second axial stator are arranged on the casing; and
the radial rotor, the first axial rotor and the second axial rotor are connected with the shaft.

5. The motor of claim 1, wherein
the rotor structure of the radial rotor comprises a shape rotor, a V type rotor, a multi-layer air slot rotor or a switched reluctance rotor structure; and
the permanent magnets are surface mounted, surface inlay and Halbach array, and the surface sticking coefficient of the permanent magnet ranges from 0.8 to 1.

6. The motor of claim 1, wherein
the radial stator comprises an integer slot distributed winding structure: the number of slots and the number of poles need to meet the formula $q=S/(2*P*m)$, and the value of q is integer; and
the second axial stator and the first axial stator comprise a fractional slot concentrated winding structure: the number of slots and the number of poles need to meet the formula $S=2P+2$, wherein m is the phase of motor, S is the slot number of motor, p is the pole of motor, q is the number of slots per pole of motor.

7. The motor of claim 2, wherein an outer diameter of the radial rotor is larger than that of the first axial rotor or the second axial rotor, wherein outer ratio of diameters between the first axial rotor and the radial rotor preferably is in the range from 0.7 to 0.9.

8. The motor of claim 1, wherein when the ratio of outer diameters between the radial rotor and the first axial rotor or the second axial rotor is fixed, the ratio of axial thickness between the radial rotor and the first axial rotor or the second axial rotor is in the range from 0.2 to 0.8.

* * * * *